US012669105B2

(12) United States Patent
Kroboth

(10) Patent No.: US 12,669,105 B2
(45) Date of Patent: Jun. 30, 2026

(54) BOOMERANG HYDRO MULTIPLIER

(71) Applicant: Anthony F. Kroboth, Lehighton, PA (US)

(72) Inventor: Anthony F. Kroboth, Lehighton, PA (US)

( * ) Notice: Subject to any disclaimer, the term of this patent is extended or adjusted under 35 U.S.C. 154(b) by 58 days.

(21) Appl. No.: 18/893,349

(22) Filed: Sep. 23, 2024

(65) Prior Publication Data

US 2025/0101939 A1 Mar. 27, 2025

Related U.S. Application Data

(60) Provisional application No. 63/584,766, filed on Sep. 22, 2023.

(51) Int. Cl.
*F03B 7/00* (2006.01)

(52) U.S. Cl.
CPC .............. *F03B 7/006* (2013.01); *F03B 7/003* (2013.01)

(58) Field of Classification Search
CPC ................................. F03B 7/006; F03B 7/003
See application file for complete search history.

(56) References Cited

U.S. PATENT DOCUMENTS 699,351 A * 5/1902 Thurston ................. F03B 7/006 198/702
867,817 A * 10/1907 Girton ..................... F03B 7/006 416/7
920,361 A * 5/1909 Merriam ................. F03B 7/006 198/702
973,088 A * 10/1910 Walker .................... F03B 7/006 415/5
1,567,971 A * 12/1925 Marcel .................... F03B 7/006 415/5

FOREIGN PATENT DOCUMENTS

KR 102180515 B1 * 11/2020 ............. F03D 9/008
KR 20210009764 A * 1/2021 ............. F03B 7/003

* cited by examiner

*Primary Examiner* — Courtney D Heinle
*Assistant Examiner* — Eric A Lange
(74) *Attorney, Agent, or Firm* — Wilkinson Law Office; Clinton H. Wilkinson

(57) ABSTRACT

A boomerang hydro multiplier machine designed to enhance hydro power by providing a greater area for collection and containment of fluid thereby providing more power including a wheel device and a guide channel with an endless carrier unit secured extending around the wheel device and through the guide channel, and a series of containers provided on the endless carrier unit used in transferring a continuous fluid supply through the guide channel in order to rotate the wheel device to generate rotational energy. A fluid flow is directed at the containers entering the guide channel from near the top of the wheel device and is discharged near or under the bottom of the wheel device after being directed through the guide channel. An increased electrical energy may be generated without increasing the associated water flow.

18 Claims, 6 Drawing Sheets

BOOMERANG HYDRO MULTIPLIER

RELATED APPLICATIONS

This application claims priority to U.S. Provisional Application No. 63/584,766, filed on Sep. 22, 2023, which application is hereby incorporated by reference in its entirety.

FIELD OF THE INVENTION

The present invention relates to hydropower generating devices and renewable energy sources generally, and more particularly to gravity-type hydropower generating devices.

BACKGROUND OF THE INVENTION

There is renewed interest in hydropower generating systems as a comparatively clean, affordable, and durable renewable power source. Gravity water wheels are an old and well-known form of hydropower generating device. Conventional water wheels have a wheel framework which supports the wheel, a plurality of containers (or troughs, buckets, paddles, blades, vanes, etc.) regularly distributed around a circumference of the wheel, and a horizontal wheel axle. In overshot water wheels water or another suitable fluid is directed into the containers from above or from near the top of the vertical wheel in order to take advantage of the potential energy of the moving or falling water, transforming it into rotational energy by introducing the fluid flow at the terminal end of the high head. As the containers are sequentially filled the downward force and gravitational weight of the fluid generates a hydrostatic force which causes the wheel to rotate in a direction such that the fluid-filled buckets are continuously lowered and emptied and then returned to the top where they are refilled. The wheel axle is connected to a generator for converting rotational energy to electricity.

In some hydropower generating systems, the fluid-holding containers are connected to an endless carrier such as a belt or chain or are connected together in a similar form and then secured extending around a pair of spaced-apart aligned wheels rather than around a single rotary wheel. As a fluid fills the containers and/or a fluid force is applied against the containers near the top of the vertically higher wheel, this force is transmitted to the paired wheels which are caused to rotate in a working direction. Often, the paired wheels are the same diameter and/or are stacked vertically and have the advantage over a single wheel of increasing the vertical distance the water-filled buckets travel thereby increasing the rotational force generated by the hydropower apparatus. A drawback of many of these systems is they only provide a driving force along a single run between the wheels, after which the buckets are emptied. In addition, a significant amount of water will tend to spill out of the containers due to splashing during filling of the containers and while moving, which is inefficient and reduces the potential rotational power generated by the system. Additional arrangements to keep the containers stable and for tipping or emptying the containers at the bottom of the wheel often must be provided. It would therefore be advantageous to provide a hydropower generating system including at least one wheel or roller and an endless carrier unit such as a belt or chain having a plurality of containers attached wherein the filled containers make more than a single between the wheels, without worry of fluid spilling from the containers and being wasted, and without need for additional stabilizing of the containers or additional mechanical arrangements for tipping and emptying the containers, and which maximize the potential rotational power of the hydropower generating device.

BRIEF SUMMARY OF THE INVENTION

The present invention relates to a hydropower generating system and device for converting the kinetic energy of a water flow into rotational energy for generating electrical power.

In one aspect, the invention is a hydropower generating device including a rotary wheel, a support frame for supporting the rotary wheel on a central axle, an endless carrier unit including a plurality of containers such as buckets connected to the carrier unit, and a closed loop guide channel which may also be supported by the support frame, wherein the endless carrier unit is looped around and secured to a circumference of the wheel and through the guide channel. The closed loop guide channel has an entrance near the top of the wheel, a first segment which is downwardly angled at an acute angle from the entrance extending away from the wheel, a second segment which is curved and in some embodiments is semicircular having an upper end extending downwardly from a distal end of the first segment and a lower end, and a third segment which connects to a lower end of the second segment and is downwardly angled at an acute angle connecting to an exit near the bottom of the rotary wheel. The endless container chain is slidingly received in the guide channel and a fluid such as a water flow of water is directed into the buckets from a source located near the entrance to the guide channel, wherein gravitational forces will cause the fluid containing buckets to move on the downwardly inclined first segment of the guide channel around the guide channel and rotary wheel to rotate the wheel.

In some embodiments, the containers comprise an endless bucket chain wherein the buckets are configured to fit snugly in the closed loop guide channel to minimize gaps between the containers and the inner wall of the guide channel so as to minimize the passage of fluid through any such gaps.

In another aspect, the invention is a rotary hydropower generating device including a pair of rotary wheels each oriented vertically on an axle and being rotatable on a horizontal axis, wherein the diameter of one of the wheels is greater than the diameter of the other wheel, wherein the wheels are spaced apart horizontally and the apex of the larger diameter wheel is at a higher vertical position than the apex of the smaller diameter wheel, and the bottom of the larger diameter wheel is positioned lower vertically than the bottom of the smaller diameter wheel; and an endless carrier unit such as a track belt or chain including a plurality of regularly spaced-apart fin elements rotatably attached to the wheels extending around the outer rim of the wheels such that rotational movement of the endless track carrier is transferred to said wheels. A closed loop guide channel or enclosure through which the endless carrier unit is passed extends at a downward incline from an entrance near the apex of the larger diameter wheel around the smaller diameter wheel to an exit near the bottom of the larger diameter wheel. A fluid flow is directed at the fin elements near the entrance to the guide channel. The fin elements have a tight fit with the inner walls of the guide channel such that the fluid will fill the compartments formed between the fin elements and walls of the guide channel and gravitation forces will cause the endless carrier and the rotary wheels to rotate in a working direction.

In another aspect, the hydropower assembly further comprises a power generating device coupled to one of the wheels for producing electrical power from the rotational energy of the wheel. In some embodiments, the power generating device is incorporated into the larger diameter wheel.

In another aspect, the hydropower assembly further comprises a first power generating device coupled to a wheel and a second power generating device coupled to another wheel for producing electrical power from the rotational energy of the first and second wheels.

In another aspect, the central axle of the first wheel is substantially horizontally aligned with the central axle of the second wheel.

In another aspect, a series of grooves are formed around a circumferential portion of the first and second wheels at uniform intervals, and matching grooves are formed on the inner side of the endless carrier.

In another aspect, the segment of the guide channel connecting between the entrance to the guide channel above the first wheel and the second wheel is an inclined plane towards the second wheel, and the segment of the guide channel connecting between bottom of the second wheel and exit near the bottom of the first wheel is at an inclined plane towards the first wheel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE INVENTION

Figure 1:
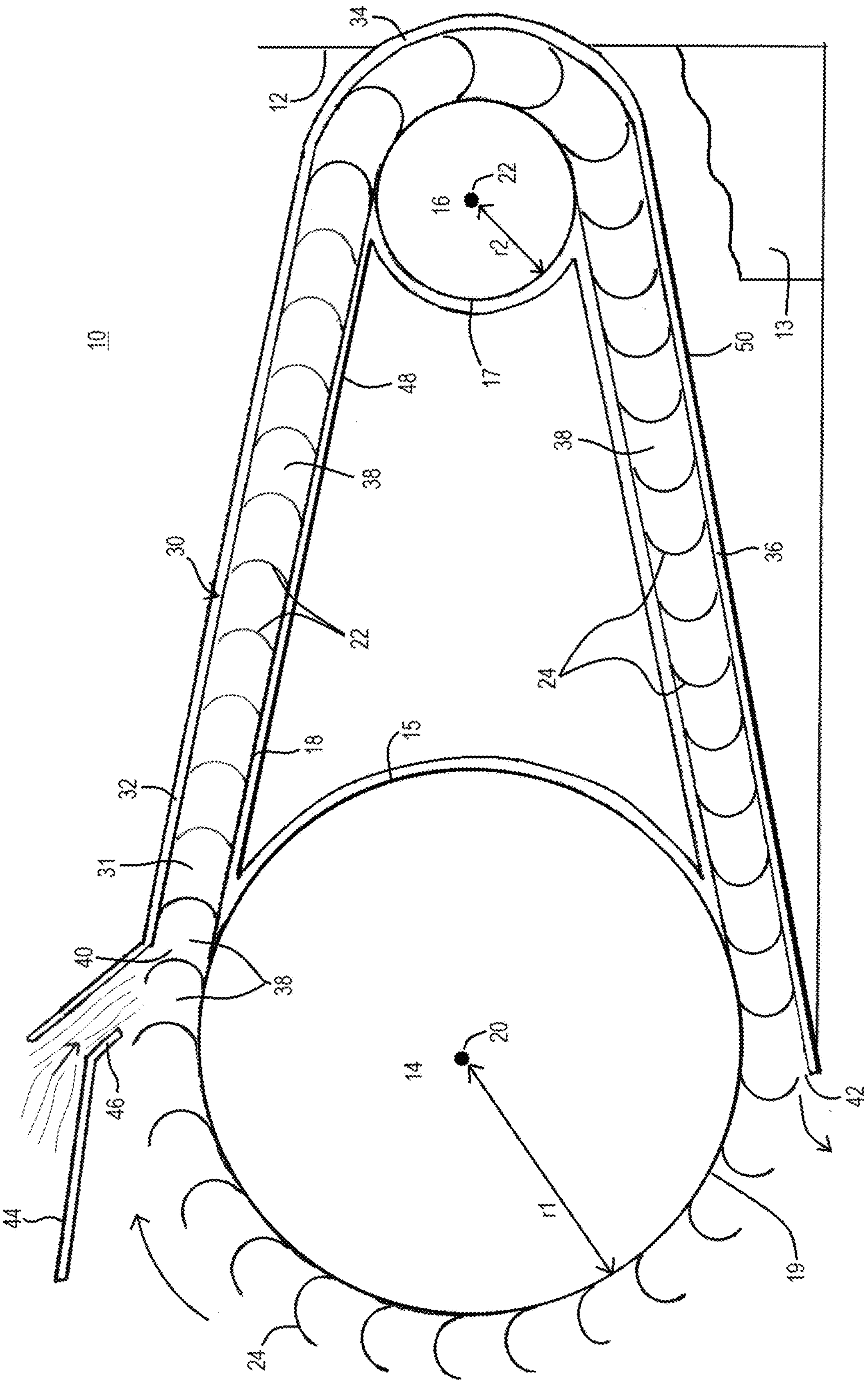
FIG. 1 is a partially sectional diagrammatic side view illustrating an embodiment of the hydropower generating wheel assembly of the present invention.

Reference will now be made in detail to embodiments of the present invention, examples of which are illustrated in the accompanying drawings. While the present invention will be described in conjunction with the several embodiment(s), the description is not intended to be understood in a limiting sense, but to be an example of the invention presented solely for illustration thereof, and by reference to which in connection with the following description and the accompanying drawings one skilled in the art may be advised of the advantages and benefits of the invention. On the contrary, the present invention is intended to cover alternatives, modifications, and equivalents, which may be included within the spirit and scope of the invention as defined by the appended claims. Further, it will be appreciated that embodiments of the present disclosure may employ any combination of features described herein. Descriptions of well-known starting materials, equipment, components, and processing techniques may be omitted so as to not unnecessarily obscure the embodiments herein.

In the description of the present invention, it should be understood that the terms “apex,” “upper,” “lower,” “top,” “bottom,” “left,” “right,” and the like refer to orientations or positions based on those shown in the drawings. These terms are only for the convenience and simplification of the description of the present invention, rather than indicating or implying that the device or element referred to must have a specific orientation or be constructed and operated in a specific orientation. The terms “first” and “second” do not represent the importance of components, and therefore cannot be construed as limiting the present invention. Specific dimensions used in describing the embodiments are only for illustrating the technical solution without limiting the protection scope of the present invention. Reference herein to “one embodiment,” “an embodiment,” “other embodiments,” “an aspect,” and like terms means that a particular feature, structure, or characteristic described in connection with the embodiment is included in at least one embodiment of the disclosure. The phrases “in an embodiment,” “in one embodiment,” and “according to an aspect” as used herein are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words “comprise,” “comprising,” and the like are to be construed in an inclusive sense, as opposed to an exclusive or exhaustive sense; that is to say, in the sense of “including, but not limited to.” As used herein, the terms “connected,” “coupled,” “joined,” or any variant thereof, means any connection or coupling, either direct or indirect, between two or more elements. Additionally, the words “herein,” “above,” “below,” and words of similar import, when used in this document, shall refer to this document as a whole and not to any particular portions of this application. If the specification states a component or feature “may,” “can,” “could,” or “might” be included or have a characteristic, that particular component or feature is not required to be included or have the characteristic.

As used herein, the singular forms “a,” “an,” and “the” include plural references unless the context clearly dictates otherwise. Unless defined otherwise, all technical and scientific terms used herein have the same meanings as commonly understood by one of ordinary skill in the art. When used in this document, the term “exemplary” is intended to mean “by way of example” and is not intended to indicate that a particular exemplary item is preferred or required. When terms such as "first" and "second" are used herein to modify a noun, such use is simply intended to distinguish one item from another and is not intended to require a sequential order unless specifically stated.

FIG. 1 illustrates diagrammatically a hydropower device 10 in accordance with the present invention, which device 10 comprises a component of a hydropower system for generating electrical energy.

According to presently described embodiment, hydropower device 10 generally includes a support frame or stand 12 which supports a first rotary wheel or roller device 14, a second rotary wheel or roller device 16, and an endless carrier unit such as an endless track belt or carrier chain 18 which is operably connected extending around the wheels 14 and 16, and a closed loop compartment or guide channel 30 configured to rotatably receive the endless carrier unit. The first wheel 14 is rotatably connected to a horizontal central axle or shaft 20, and second wheel 16 is similarly rotatably connected to a horizontal central axle or shaft 22. Rotating shafts 20 and 22 are securely journaled in suitable bearings and supported between a pair of side walls 13 (partially removed) forming part of the support frame or stand 12, such that first wheel 14 and second wheel 16 are supported in an upright or vertical orientation on the support frame 12 and in a horizontally spaced-apart relation to each other. The first wheel 14 may also sometimes be alternatively referred to herein as the main wheel and the second wheel 16 may also sometimes be alternatively referred to herein as the secondary wheel. Wheels 14 and 16 may be made of any suitable materials including but not limited to metal, plastic, stainless steel, and aluminum. First wheel 14 has a rim 15 and second wheel 16 has a rim 17. In some embodiments, wheels 14 and 16 may comprise a sprocket wheel, gear, roller or pulley, and may have a series of depressions or seats positioned around a circumferential portion of the wheel rims 15 and 17 which are adapted to receive corresponding knobs, cleats, teeth, or projections in the endless carrier. One or both wheels 14 and 16 may also be formed of a pair of wheel frames of equivalent size which are joined together to form the wheel structure.

As shown in FIG. 1, first wheel 14 has a larger radius r1 than the radius r2 of the second wheel 16. In some embodiments, the radius r1 of first wheel 14 may be at least twice the radius r2 of second wheel 16. In addition, first wheel 14 and second wheel 16 are mounted on stand 12 such that the rim 15 at the highest point or apex of the first wheel 14 is positioned higher vertically than rim 17 at the highest point or apex of the second wheel 16. In addition, the lowest point or bottom of the first wheel 14 is positioned lower vertically than the lowest point or bottom of the second wheel 16. In some embodiments, shaft 20 of first wheel 14 is substantially horizontally aligned with shaft 22 of second wheel 16 on support frame 12.

Endless carrier 18 extends around first wheel 14 and second wheel 16 such that wheels 14 and 16 are rotationally connected by the endless carrier, and as endless carrier is rotated wheels 14 and 16 will simultaneously rotate in the same direction. A means for controlling the direction of rotation of the wheels 14 and 16 such as a clutch means may also be provided so that the wheels 14 and 16 are arranged to only rotate in a single direction of rotation. In an embodiment, the wheel axle 20 of first wheel 14 is only permitted to freely rotate in a clockwise direction as oriented in FIG. 1 or in the direction of the arrow in FIG. 1. Endless carrier 18 is mounted extending around the outer circumference of rim 15 of first wheel 14 and rim 17 of second wheel 16. Endless carrier 18 is flexible and may be made of any suitable material or combination of materials such as metal, alloys such as steel, rubber, and other suitable elastomers, and may be an endless wire, loop, chain, track, or combinations thereof. In an embodiment, carrier unit 18 may comprise a pair of spaced apart carrier chains formed of pivotally connected links which connect to sprockets on the first wheel 14 and second wheel 16, while in another embodiment carrier 18 may comprise a plurality of aligned guide cleats or projections on an inner surface of the carrier 18 which correspond to depressions or seats positioned on the outer rim of the wheels 14 and 16. Carrier 18 may also have any suitable thickness or width.

A series of containers, in this embodiment shown as blades or fin elements 24, are mounted to the endless carrier 18 at regular intervals extending entirely around the carrier 18. Fin elements 24 project away from the exterior surface or outer side 19 of carrier 18 and may be made of any suitable material such as plastic or metal and are securely fastened to belt carrier in any suitable manner. Suitable accessories such as bolts, hinges, rivets, adhesives, etc. can be used to connect the fin elements 24 to carrier 18. As oriented in FIG. 1, carrier 18 is arranged to rotate about the first wheel 14 and second wheel 16 in a clockwise direction. The main body of the fin elements 24 in some embodiments may be curved in cross-section while in other embodiments may have other suitable cross-sectional shapes. In FIG. 1, the fin elements 24 are concavely curved on the water-receiving side 25 or the side facing away from the direction of rotation. Fin elements 24 may additionally include top, bottom and/or side flanges coupled to the main body as well as strategically positioned strengthening brackets or members so as to be capable of withstanding the weight of a working fluid such as water continuously contacting the fin elements. In some embodiments, the side edges of adjacent fin elements 24 may be connected together in a suitable manner such as by a flexible member to stiffen or add strength to the fin elements 24, while in other embodiments the outer ends of the fin elements 24 are not connected. In still other embodiments, rather than having separate fin elements mounted to carrier 18, the fin elements 24 may be integrally formed with carrier 18 or the carrier 18 may have interlocking links and also be formed so as to function as a fin or blade.

The closed loop elongated guide channel or housing 30 is configured such that the endless carrier 18 will circulate through the guide channel 30 as the carrier 18 rotates on the first and second wheels 14 and 16. The guide channel 30 may be mounted to and supported by the support frame 12, and may have any suitable cross-sectional shaped interior 31 including but not limited to having a tubular or quadrilateral interior shape. Closed-loop guide channel 30 may be described generally as having a "boomerang" shape in a side view and extends from a first open end positioned near the top or apex of first wheel 14, downwardly around an outer side of second wheel 16, to an second open end positioned underneath or near the bottom of the first wheel 14. Preferably, the fin elements 24 will exit the guide channel 30 before the endless carrier 18 starts rotating upwardly on the first wheel 14. More particularly, guide channel 30 has an upper segment 32 which extends at a downward incline and at an acute angle from the first open end or inlet entrance 40 positioned near the top of the first wheel 14 to a position above the second wheel 16; a second segment 34 which extends from a position above the second wheel 16 downwardly around the outer side of the second wheel 16 to a position below the second wheel 16; and a lower segment 36 which extends at a downward incline and at an acute angle from the position under of the second wheel 16 to the second open end or exit 42 positioned under the first wheel 14. In some embodiments, compartments 38 may be defined as being formed between pairs of fin elements 24 on carrier 18 and the inner walls of the guide channel 30 when the fin elements 24 are sequentially circulated through the guide channel 30. The interior walls of guide channel 30 may be smooth or adapted to minimize disruption of fluid flow through the guide channel 30.

A chute, channel, pipe, or other conduit 44 which is in communication with a fluid supply (e.g., a continuous water flow) has a downwardly angled exit opening 46 positioned adjacent the inlet entrance 40 or other opening to guide channel 30 and is adapted to feed a continuous flow of fluid into the compartments 38 formed between adjacent pairs of fin elements 24. After a first compartment 38 is filled, the water weight and gravitational forces will cause the endless carrier 18 to begin rotating clockwise moving the fluid containing compartment toward the top of the second wheel 16 on the downwardly inclined first segment 32 of the guide channel 30. As the empty compartments 38 sequentially circulate to a position adjacent to inlet entrance 40 and in line with the water flow, such compartments 38 will be filled with fluid. Upper segment 32 of enclosure 30 is downwardly inclined towards second wheel 16, and therefore due to gravitational forces the majority of the weight of the fluid in each filled compartment 38 will be urged against the forwardmost fin element 24 of the compartment 38 and cause the carrier 18 to begin to accelerate and rotate clockwise as the device is oriented in FIG. 1. Successive filling of the consecutive compartments 38 will thereupon cause carrier 18 to continuously rotate in a clockwise direction and to move the liquid filled compartments 38 on carrier 18 through the top segment 32 of the guide channel 30, then downwardly around the outside of the second wheel 16 in middle segment 34 of the guide channel 30, and then from the lower end of second wheel 16 to the lower end of first wheel 14 in bottom segment 36 of the guide channel 30 to exit 42. As the carrier unit 18 continuously rotate on the wheel device 14 and 16, the first and second wheels 14 and 16 will be rotationally driven and generate rotational energy, which may be supplied from either wheel 14 and 16 to an electric power generator having a conventional structure not shown here. In some embodiments, in the bottom segment 36 of the guide channel 30, the fluid may be supported directly on the floor 50 of the guide channel 30 rather than at least partially on the carrier 18 as in the upper segment 32. The combined fluid weight of the fluid-filled compartments 38 in the downwardly inclined generally straight segments or runs 32 and 36 of guide channel 30 as well during the downward rotation of the compartments 38 around second wheel 16 in segment 34 will cause first wheel 14 and second wheel 16 to continually rotate in a clockwise direction. Upon each fluid-filled compartment 38 reaching the exit 42 of guide channel 30, the fluid is no longer confined and will be released into a drain channel, exit pipe, containment area or other suitable receiver.

Fin elements 24 may be dimensioned and shaped to closely correspond with the interior dimensions and shape of the guide channel 30 so there is a seal or at most only a small gap between the fin elements 24 and interior of the guide channel 30 to inhibit fluid from flowing between the fin elements 24 and interior wall when in the guide channel 30, which could affect the rate of rotation of carrier 30. In some embodiments, where fluid is supported directly on the carrier 18 between the fin elements 24, the floor 48 of upper section 32 of the housing 30 may be fitted with rollers or support slides to reduce friction with the floor of the guidance channel or compartment 30, facilitating continuous movement of the carrier 18. In another embodiment, rollers or slides may be coupled to the top edge or rim of the fin elements 24 to reduce sliding friction on floor 50 of the bottom section 36 of the housing 30.

The hydropower device 10 thus is driven by the force and/or weight of a stream of fluid which is continuously flowing into and sequentially filling the compartments 38 defined between the regularly spaced-apart fin elements 24, the endless carrier 18, and the top, side, and bottom walls of the guide channel 30. As the working fluid in the chute 44 above first wheel 14 is released on to carrier 18, which may be in a manner similar to conventional overshot water wheels, the kinetic or potential energy of the fluid against the fin elements 24 as well as the downward incline of the upper segment 32 of the channel 30 will cause the carrier 18 to begin to turn and thereby effect rotation of the first wheel 14 and second wheel 16. As the endless carrier 18 continues to rotate, the fluid-filled compartments 38 will successively move through middle segment 34 around the outside of second wheel 16 and then through the lower segment 36 to the lower end of first wheel 14, where the fluid will be released at exit 42. The second wheel 16 will rotate faster and more revolutions per minute (RPM) than the first wheel 14 due to the smaller diameter of second wheel 16. One or both shafts 20 and 22 may be utilized as a power transmitting shaft by attaching a pulley wheel or the like to the shaft which may then be attached to other suitable machinery. For example, shafts 20 and 22 may be operatively connected to spin the rotor of a generator to produce electricity. The present invention utilizes the weight of water for the continuous generation of electrical energy. Due to inertia and to the power of the movement generated by a weight of water, movement will be perpetual because for each compartment emptied in the lower part, there is a compartment filled in the upper portion.

Figure 2:
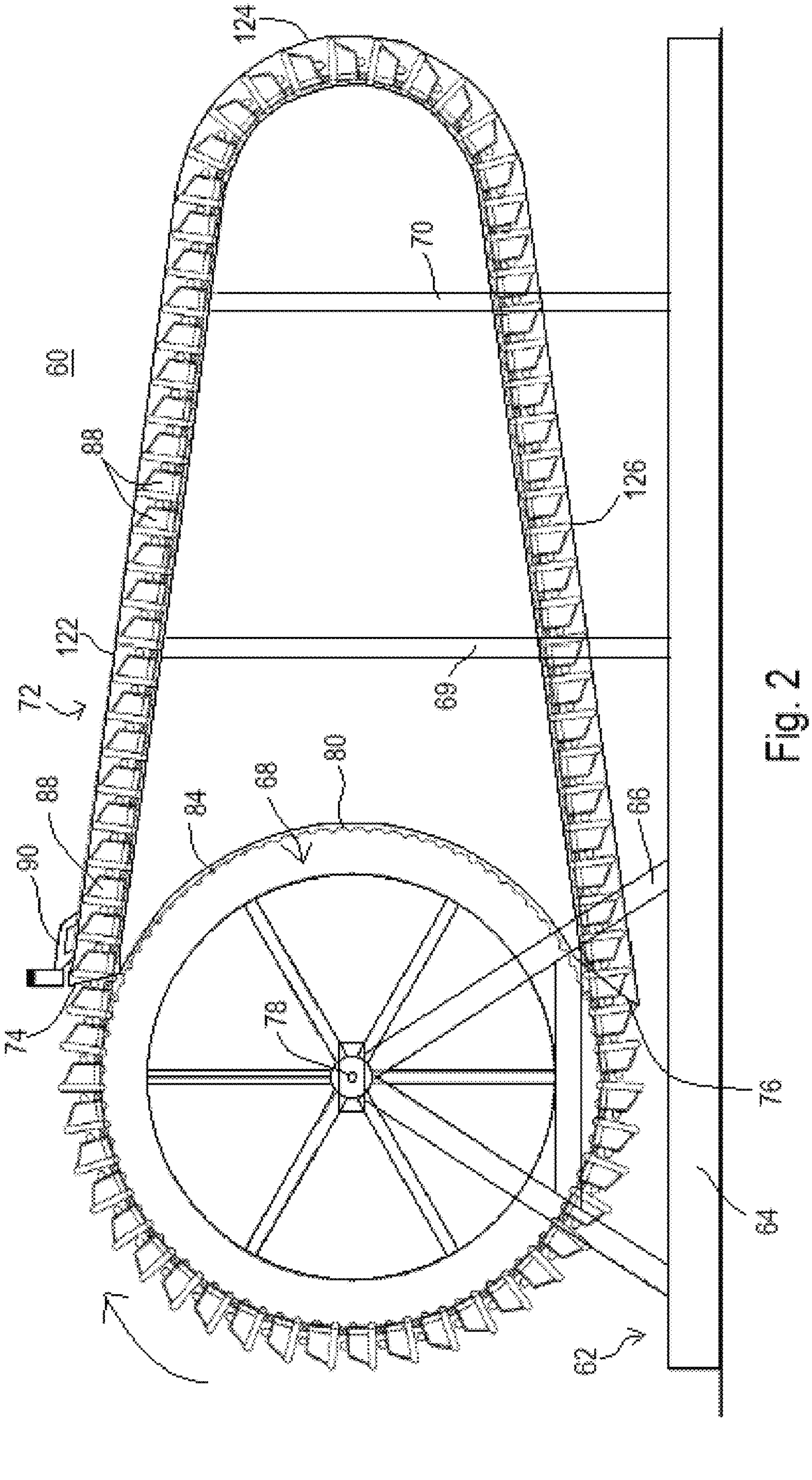
FIG. 2 a diagrammatic side elevation view of another embodiment of the hydropower generating wheel assembly of the invention.
Figure 3:
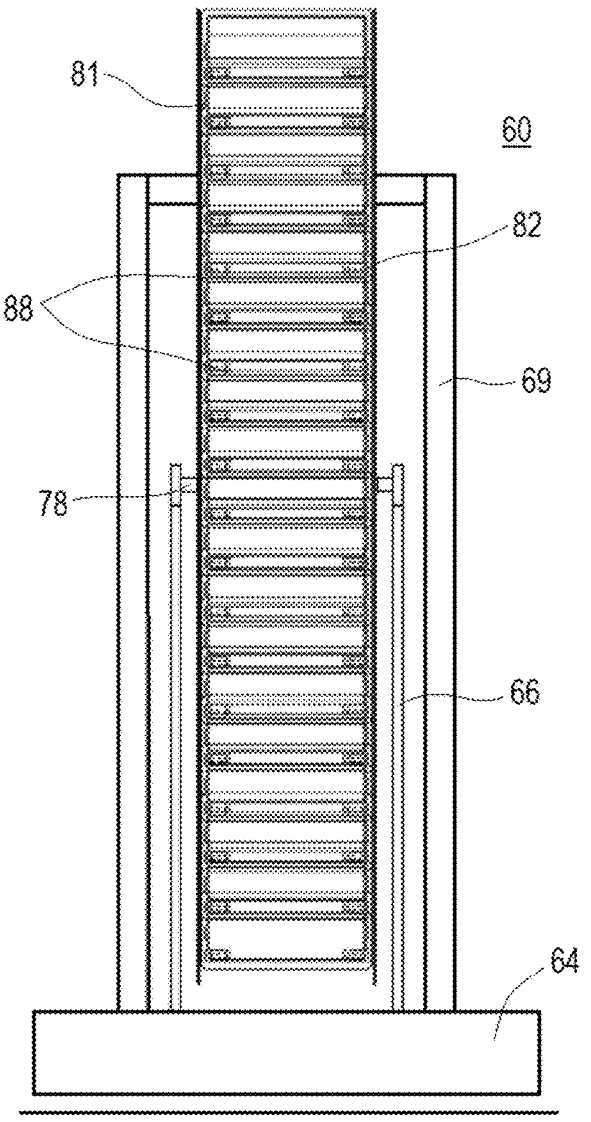
FIG. 3 is a front view of the embodiment shown in FIG. 2.
Figure 4:
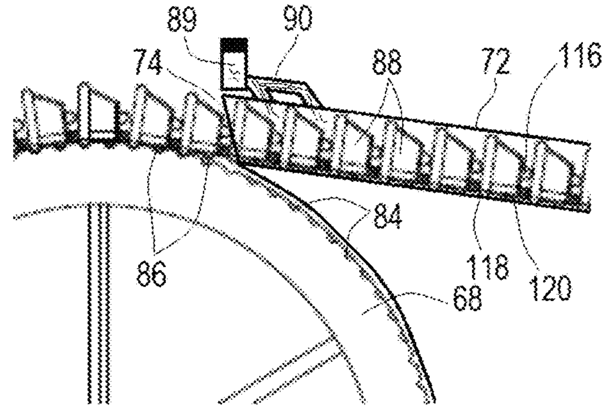
FIG. 4 is an enlarged view of the entrance to the guide channel and fluid inlet to the guide channel of the embodiment shown in FIG. 2.
Figure 5:
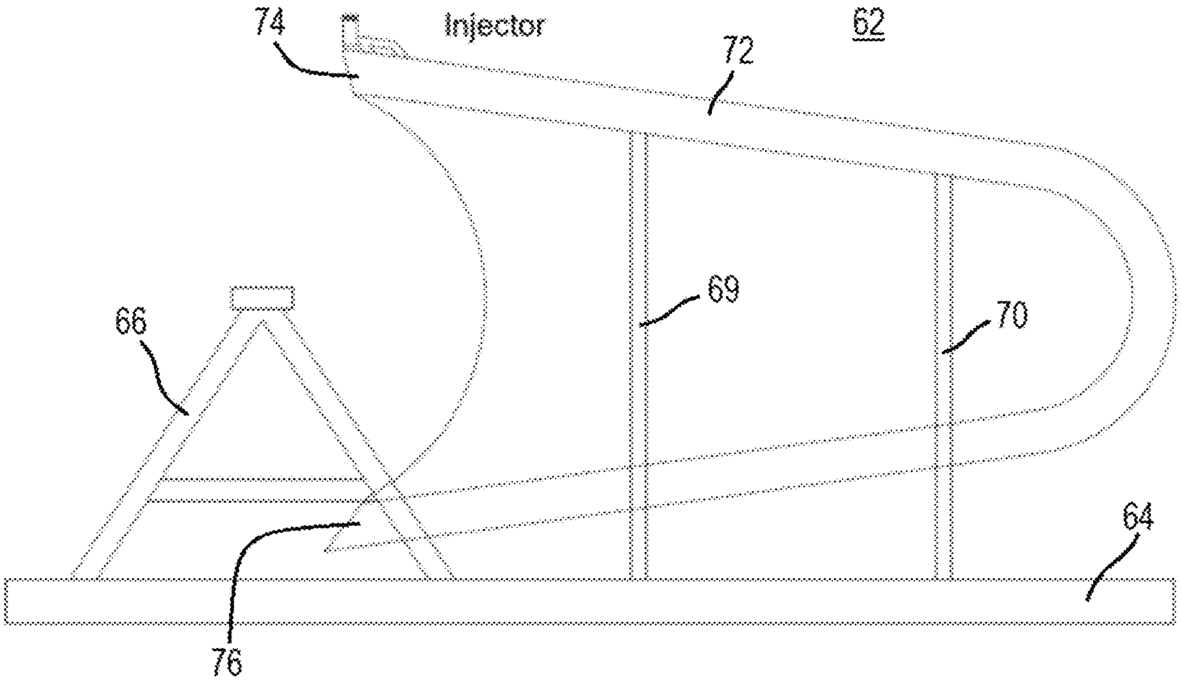
FIG. 5 is a side view of the support structure and guide channel of the embodiment shown in FIG. 2 with the wheel assembly and endless bucket chain removed.
Figure 6:
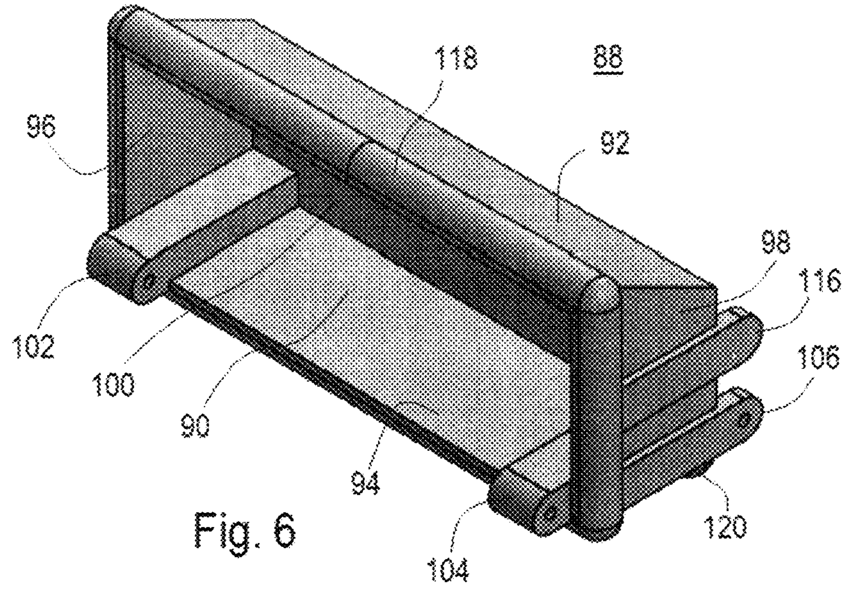
FIG. 6 is an isometric top view of one of the buckets in accordance with an embodiment of the invention.
Figure 7:
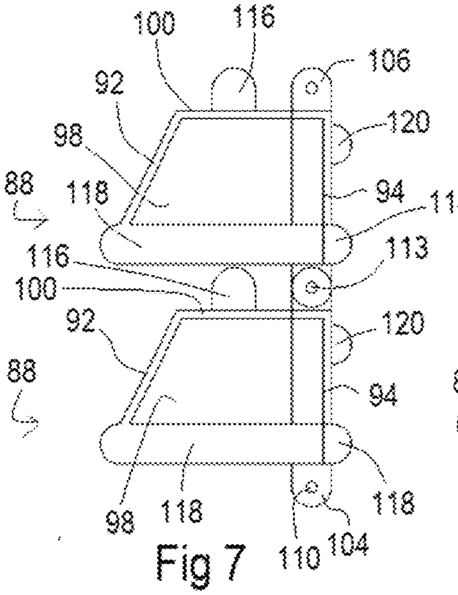
FIG. 7 is a side view of two of the endless chain buckets connected.
Figure 8:
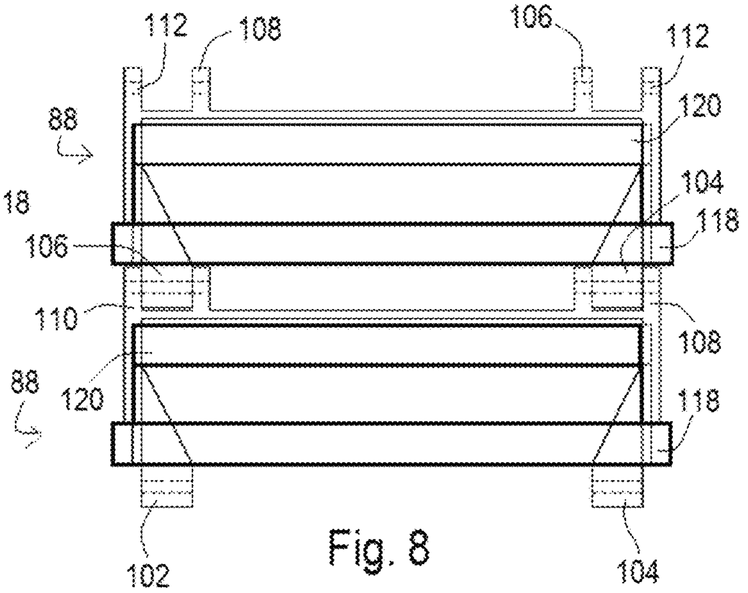
FIG. 8 is a bottom view of two endless chain buckets connected.

FIGS. 2 through 5 illustrate another embodiment of a hydropower device 60 in accordance with the present invention, which FIGS. 6-8 illustrate a container configured for use with the invention. In this embodiment, hydropower device 60 generally includes a support frame or stand 62, shown separately in FIG. 5, having a base 64, an A-shaped wheel support 66 which rotatably supports a wheel-like device 68, and spaced apart upside-down U-shaped supports 69 and 70 (see also FIG. 3) which support closed loop guide channel 72. It will be understood that support frame 62 is merely illustrative and any suitable support frame structure may be utilized. Guide channel 72 has a curved configuration with a first open end 74 and a second open end 76 and is closed between open ends 74 and 76. Wheel 68 is rotatably attached to A-shaped support 66 in an upright or vertical orientation supported on a horizontal central axle or shaft 78 and may be securely journaled in suitable bearings on support 66 in a conventional manner. Wheel 68 may be made of any suitable material including but not limited to plastic, metal alloy, stainless steel, and aluminum. Wheel 68 has a rim 80 and as shown in FIG. 3 may be formed of two wheel sections 81 and 82 of corresponding size connected together by connecting frame pieces. Each of the wheel sections 81 and 82 will have suitable slots or seats 84 formed around their circumference. Seats 84 are configured for receiving suitable ribs 86 formed on each bucket 88 in an endless bucket chain as will be described in greater detail below. In some embodiments, the seats 84 in the wheel circumference have a curved shape and the outer ends of the ribs 86 have a corresponding curved shape. The endless bucket chain is mounted on wheel 68 extending through the guide channel 72. As shown in FIG. 4, buckets 88 are arranged to receive a fluid such as water into the buckets 88 from a chute, channel, pipe, or other conduit 89 which is in communication with a fluid supply (e.g., a continuous water flow) and has one or more downwardly angled exit openings 90 positioned adjacent the inlet entrance 74 to guide channel 72.

FIGS. 6-8 illustrate an embodiment of the buckets 88. In FIG. 6, one of the buckets 88 is shown detached from the endless chain of buckets, while FIGS. 7 and 8 illustrate two of the buckets 88 connected together. Each bucket has a front opening 90 in communication with an interior defined by top and bottom walls 92 and 94, end walls 96 and 98 and a rear wall 100. In addition, each bucket 88 has front links 102 and 104 formed extending forwardly along the corners of the bottom wall 94 and end walls 96 and 98, and pairs of rear links 106 and 108 extending from rear wall 100. Front links 102 and 104 have through-apertures 110 and pairs of rear links 106 and 108 have aligned through-apertures 112. As illustrated in FIG. 8, front links 102 and 104 on one of the buckets 88 are configured to be positioned between pairs of rear links 106 and 108 on an adjacent bucket 88 and a rod or pin 113 with a bushing is passed through aligned apertures 110 and 112 in order to pivotally connect the buckets 88 together into an endless chain. Spacer extensions 116 extend from the rear wall 100 of the buckets 88 along side walls 96 and 98 above and spaced apart from the pairs of rear links 106 and 108. In addition, rim 118 is formed extending around the front opening 90 of the buckets 88. As shown in FIG. 7, extensions 116 are configured to abut against vertical portions of the rim 118 of an adjacent bucket 88 to prevent the buckets 88 when joined together from pivoting on pins 113 towards each other past a point where the extension 114 and 116 are contacting rim 118. Rim 118 is also dimensioned and configured to fit snugly with the interior walls of the guide channel 72 so that very little liquid is able to pass between the interior surface of the guide channel 72 and edges of rim 118. Finally, transverse rib 120 extends from bottom wall 94 of the buckets 88 extending between side walls 96 and 98. Rib 120 is spaced apart from the rim 118 on bottom wall 94, which portion of rim 118 also serves as a transverse rib on the bottom wall 94 which are configured to fit and be inserted in depressions or seats 84 on the circumference of the wheel as the endless bucket chain moves around the wheel 68.

In use, a fluid such as water fed in a chute, channel, pipe, or other conduit 89 is directed through downwardly angled water inlet 90 positioned above the upper segment 122 of the guide channel 72 into one or more buckets 88. Starting at first opening or entrance 74 upper segment 122 of guide channel 72 is generally straight and slants downwardly at an acute angle. The distal end of upper segment 122 connects to a downwardly curved segment 124 having a concave portion facing wheel 68. The lower end of downwardly curved segment 124 connects to a lower segment 126 which is also generally straight and slanted downwardly at an acute angle to second opening or exit 76. Gravity plus any pressure of the water flow exiting from water inlet 90 and filling the buckets 88 will cause the endless chain of buckets to begin rotating in a clockwise direction on wheel 68 and through guide channel 72. The water weight of the buckets is therefore utilized along the entire upper segment 122, downwardly curved segment 124, and lower segment 126 of the guide channel 126, since after exiting water inlet 90 the only means for the water to exit the guide channel 72 is through second opening 76. The guide channel 72 is configured and dimensioned such that both the upper segment 122 and lower segment 126 are angled downwardly, and in an embodiment, the midpoint of the curved segment 124 of the guide 72 is horizontally aligned with the shaft 78 of the wheel 68. This present configuration thus is a substantial improvement over prior art configurations where an endless chain may be filled with water from the top of a wheel to the bottom or along one side segment but not both.

The inner surface of the guide channel 72 is smooth and may be formed of or lined with a natural or artificial material or otherwise have a surface texture with low friction characteristics, including but not limited to plastic polymers, fractal textures, and others, such that the buckets 88 will slide easily in guide channel 72. In the upper segment 122, the buckets 88 will be supported on the interior surface of the guide channel on the bottom portion of rim 118 and transverse rib 120, providing a relatively small contact surface with the floor of the guide channel 72 which will reduce friction. In the lower segment 126, the buckets 88 will be upside down as compared their orientation in upper segment 122, and thus will be substantially supported on the transverse portion of rim 118 along the front top wall 92, similarly providing a relatively small contact surface. The fluid being transported through the guide channel 72 in the buckets 88 will also act as a lubricant and maintain operational temperatures. In some embodiments, rolls may be incorporated into the transverse portions of rim 118 and transverse rib 120 to provide a rolling rather than a sliding motion in guide channel 72, further reducing sliding friction.

As shown in both FIG. 2 and FIG. 3, in the present invention, the fluid need not be contained in upright containers and prevented from spilling out of the containers as they descend as in conventional overshot waterwheels, since in the present invention the entire volume of water is contained by the guide channel. The fin elements 24 and buckets 88 on the endless carrier unit illustrated are configured to continuously guide the fluid through the guide channel and to rotate the at least one wheel device in order to generate rotational energy which can be utilized to generate power. It will be understood by those skilled in the art that the wheels or rollers supporting the endless carrier may have different sizes and dimensions, may be spaced apart different distances, and the upper and lower inclined segment or runs of the closed loop guide channel may modified to have different angles or degrees of inclination in order to achieve the particular requirements for use of the invention and to accommodate different water volumes.

Figure 9:
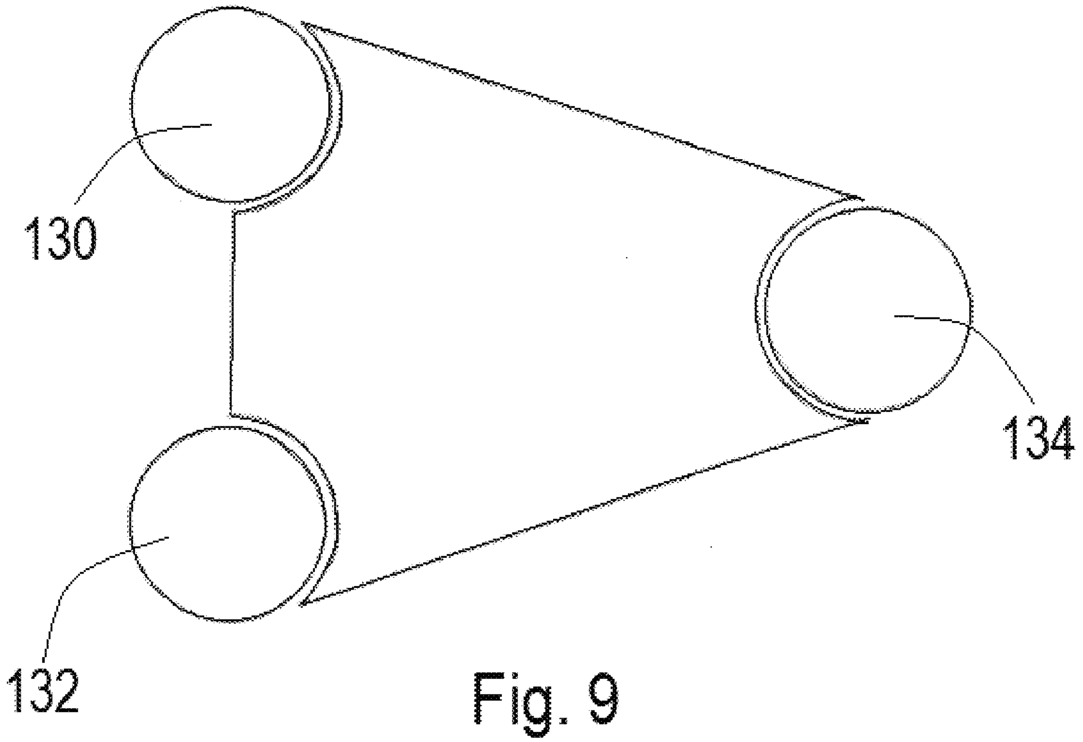
FIGS. 9 and 10 illustrate diagrammatically further wheel configurations in accordance with the present invention.
Figure 10:
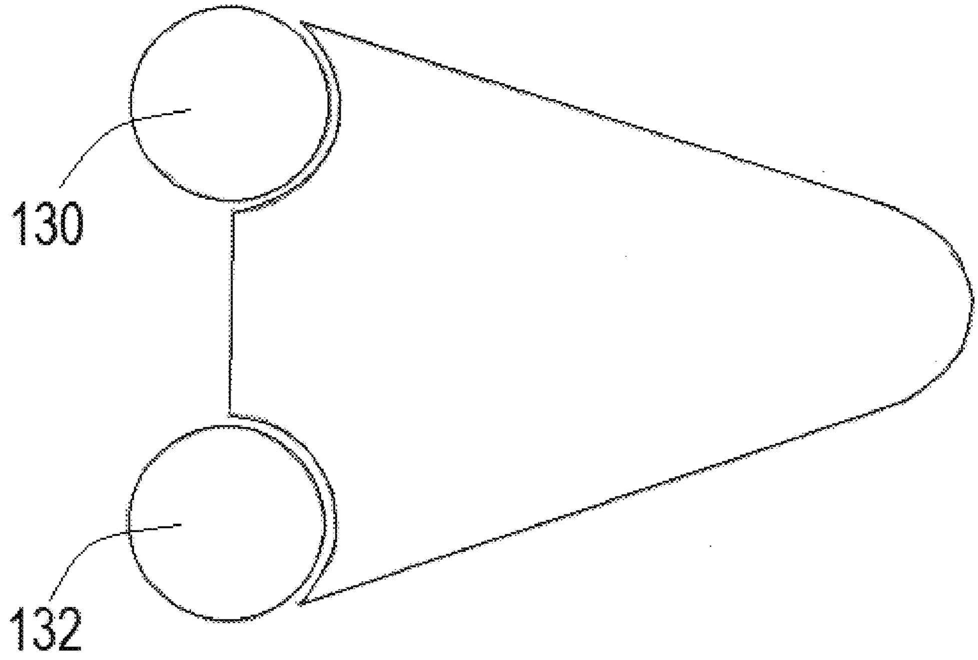

FIGS. 9 and 10 illustrate diagrammatically additional wheel configurations which could be utilized in accordance with the present invention. In both FIG. 9 instead of providing a larger diameter wheel and a smaller diameter wheel as in FIG. 2, a pair of vertically spaced wheels 130 and 132 having the same diameter as smaller wheel 134 could be utilized. In addition, as illustrated in FIG. 10, the pair of vertically spaced wheels 130 and 132 could be utilized instead of a single larger diameter wheel as in FIG. 2. These embodiments are merely illustrative and other wheel arrangements and combinations of wheels with different diameters could also be utilized in accordance with the invention.

The foregoing description has been presented for purposes of illustration and description and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A hydropower generating device comprising:

a first rotary wheel device and a second rotary wheel device, a support frame configured for supporting the first wheel device vertically on a central axle and the second wheel device vertically on another central axle in a spaced-apart relation from the first wheel device, the second wheel device having a smaller diameter than the first wheel device and horizontally aligned with the first wheel device, a plurality of containers connected to form an endless carrier unit, and a closed loop guide channel, wherein the endless carrier unit is mounted to the first wheel device and second wheel device and extending through the guide channel so as to rotationally connect the first wheel device and second wheel device, said guide channel having an entrance opening near a top of the first wheel device, a first segment extending at an acute angle downwardly from the entrance opening to a position above the second wheel device, a downwardly curved second segment extending around an outer circumference of the second wheel device, and a third segment extending at an acute angle downwardly from a position below the second wheel device and connecting to an exit opening located near a bottom of the first wheel device, and a fluid inlet conduit positioned near the entrance opening configured for directing a fluid towards the containers upon entering the guide channel and driving the endless carrier unit to circulate in a direction such that the containers are continually moved through the guide channel from the entrance opening to the exit opening and thereupon rotating the first wheel device and generating rotational energy.

2. The hydropower generating device of claim 1 further comprising a generator connected to the first wheel device for generating electrical energy.

3. The hydropower generating device of claim 1 wherein the containers further comprise fin elements attached to the endless carrier unit.

4. The rotary hydropower generating device of claim 3 further comprising a plurality of fluid-receiving compartments formed between the fin elements.

5. The hydropower generating device of claim 1 wherein the containers further comprise a plurality of buckets having a front opening, a rim extending around the front opening configured to provide a close fit with an interior wall of the guide channel, and a pair of transverse ribs configured to mate with seats formed in a circumference of the first and second wheel device, wherein one of said transverse ribs is formed of a transverse bottom section of the rim.

6. The hydropower generating device of claim 5 wherein the buckets further comprise pairs of front links and rear links for pivotally securing adjacent buckets together to form the endless carrier unit.

7. The hydropower generating device of claim 1 wherein the second wheel device has a diameter of one-half of the first wheel device.

8. The hydropower generating device of claim 1 wherein the guide channel and second wheel device are mounted to the support frame for supporting the first rotary wheel device.

9. The hydropower generating device of claim 1 wherein the downwardly curved second segment of the guide channel has a semicircular configuration.

10. The hydropower generating device of claim 1 further comprising a series of seats formed around a circumferential portion of the first and second wheel device at uniform intervals which engage with matching projections on an inner side of the endless carrier unit.

11. A hydropower generating device comprising:

a rotary wheel device;

a support frame for supporting the wheel device vertically on a central axle;

a closed loop guide channel having an interior wall, an entrance opening located near a top of the wheel device, an exit opening located near a bottom of the wheel device, an upper segment extending from the entrance opening downwardly and outwardly away from the wheel device at an acute angle, a downwardly curved middle segment having a radius smaller than a radius of the wheel device, and a lower segment extending downwardly at an acute angle from a lower end of the second segment and returning to the exit opening;

a plurality of containers connected to form an endless carrier unit, said endless carrier unit secured extending around a circumference of the wheel device and through the guide channel; and a fluid inlet conduit positioned near the entrance opening configured for directing a fluid towards the containers entering the guide channel and driving the endless carrier unit to circulate in a direction so the containers are continually moved through the guide channel from the entrance opening to the exit opening, thereupon rotating the wheel device and generating rotational energy;

said containers forming buckets having a front opening, a rim extending around the front opening configured to provide a close fit with the interior wall of the guide channel, and at least one transverse rib configured to mate with seats formed in a circumference of the wheel device, wherein one of the at least one transverse ribs is formed of a transverse bottom section of the rim.

12. The hydropower generating device of claim 11 wherein the buckets further comprise pairs of front links and rear links for pivotally securing adjacent buckets together to form the endless carrier unit.

13. A hydropower generating device comprising:

a support frame;

at least one wheel device mounted vertically to the support frame on a central shaft;

a guide channel mounted to the support frame in horizontal alignment with the at least one wheel device, said guide channel having an entrance opening located near a top of the at least one wheel device, an exit opening located near a bottom of the at least one wheel device, and forming a closed loop between the entrance opening and exit opening including oppositely downwardly inclined upper and lower segments extending away from and back to a position in close proximity to an outer circumference of the at least one wheel device and a downwardly curved middle segment having a top end positioned lower vertically than the entrance opening, a bottom end positioned higher vertically than the exit opening, the upper segment connecting between the entrance opening and the top end of the middle segment, and the lower segment connecting between the bottom end of the middle segment and the exit opening; and an endless carrier unit rotationally mounted to the at least one rotary wheel device and slidably mounted in the guide channel;

wherein a fluid directed into the containers at the entrance opening to the guide channel causes the endless carrier unit to circulate thereupon rotating the at least one wheel device and generating rotational energy.

14. The hydropower generating device of claim 13 wherein the upper segment is inclined at an acute angle downwardly and away from the entrance opening, and the lower segment is inclined at an acute angle downwardly from the lower end of the middle segment returning to the exit opening.

15. The hydropower generating device of claim 14 further comprising a second wheel device in a spaced relation and horizontally aligned with the first wheel device, said endless carrier unit rotationally connected to the second wheel device at a location within the middle segment of the guide channel.

16. The hydropower generating device of claim 14 wherein the at least one rotary wheel device further comprises a pair of vertically spaced wheel devices, and wherein the middle segment of the guide channel is positioned in a horizontal plane between the pair of vertically spaced wheel devices.

17. The hydropower generating device of claim 14 wherein the containers further comprise buckets having a front opening, a rim extending around the front opening configured to provide a close fit with an interior wall of the guide channel, and a pair of transverse ribs configured to mate with seats formed in the circumference of the at least one wheel device, wherein one of the transverse ribs is formed of a transverse bottom section of the rim and the buckets are configured to be slidingly supported on the at least one transverse rib in the guide channel.

18. The hydropower generating device of claim 15 wherein the at least one rotary wheel device further comprises a pair of vertically spaced wheel devices, and wherein the second wheel device is positioned in a horizontal plane between the pair of vertically spaced wheel devices.

* * * * *